United States Patent
Courtois et al.

(10) Patent No.: US 12,122,692 B2
(45) Date of Patent: Oct. 22, 2024

(54) METHOD FOR CYANOBACTERIA AND/OR CYANOBACTERIA METABOLITES REMOVAL IN AN AQUEOUS SOLUTION

(71) Applicant: SUEZ INTERNATIONAL, Paris la Defense (FR)

(72) Inventors: Sophie Courtois, Le Pecq (FR); Delphine Steinmann, Lamorlaye (FR); Gayle Newcombe, Horseshoe Bay (AU); Leon Van Der Linden, Aldgate (AU)

(73) Assignee: SUEZ INTERNATIONAL, Paris (FR)

( * ) Notice: Subject to any disclaimer, the term of this patent is extended or adjusted under 35 U.S.C. 154(b) by 510 days.

(21) Appl. No.: 17/413,934

(22) PCT Filed: Dec. 19, 2018

(86) PCT No.: PCT/IB2018/001621
§ 371 (c)(1),
(2) Date: Jun. 14, 2021

(87) PCT Pub. No.: WO2020/128560
PCT Pub. Date: Jun. 25, 2020

(65) Prior Publication Data
US 2022/0081331 A1 Mar. 17, 2022

(51) Int. Cl.
*C02F 1/52* (2023.01)
*C02F 101/30* (2006.01)
(52) U.S. Cl.
CPC ............ *C02F 1/52* (2013.01); *C02F 2101/30* (2013.01); *C02F 2209/003* (2013.01);
(Continued)

(58) Field of Classification Search
CPC .. C02F 1/52; C02F 2101/30; C02F 2209/003; C02F 2209/005; C02F 2209/11; C02F 2303/02; C02F 2303/20
See application file for complete search history.

(56) References Cited

FOREIGN PATENT DOCUMENTS

| CN | 107381753 A | * 11/2017 | ............ C02F 1/5236 |
| CN | 108101181 A | * 6/2018 | ............ C02F 1/5236 |

OTHER PUBLICATIONS

CN-107381753-A_English (Year: 2017).*
(Continued)

*Primary Examiner* — Youngsul Jeong
(74) *Attorney, Agent, or Firm* — BakerHostetler

(57) ABSTRACT

A method for cyanobacteria removal in an aqueous solution, includes a first main step of determining a percentage of coagulable dissolved aromatic organic matter to remove corresponding to a cyanobacteria percentage concentration to remove, a second main step of determining an optimal coagulant dose corresponding to the determined percentage of coagulable dissolved aromatic organic matter to remove and a third main step of applying the optimal coagulant dose as the adjusted coagulant dose for cyanobacteria removal. The invention may comprise an evaluation of cyanobacteria concentration in the aqueous solution. The invention may comprise a metabolite removal step adapted for removing dissolved cyanobacteria metabolites, comprising applying a powdered activated carbon dose/contact time couple as by determining at least one Freundlich coefficient for each metabolite type in the aqueous solution.

9 Claims, 13 Drawing Sheets

(52) U.S. Cl.
CPC ..... *C02F 2209/005* (2013.01); *C02F 2209/11* (2013.01); *C02F 2303/02* (2013.01); *C02F 2303/20* (2013.01)

(56) References Cited

OTHER PUBLICATIONS

CN-108101181-A_English (Year: 2018).*
De Julio et al. (A methodology for optimizing the removal of Cyanobacteria cells from a Brazilian eutrophic water, 2010, Brazilian Journal of Chemical Engineering, vol. 27, No. 01, pp. 113-126) (Year: 2010).*
Lin et al. (Algal removal from cyanobacteria-rich waters by preoxidation-assisted coagulation-flotation: Effect of algogenic organic matter release on algal removal and trihalomethane formation, 2018, Journal of Environmental Sciences, 63, 147-155) (Year: 2018).*
De Julio et al., "A methodology for optimizing the removal of cyanobacteria cells from a Brazilian eutrophic water", Brazilian journal of Chemical Engineering, vol. 27, No. 1, pp. 113-126, Mar. 1, 2010.
Jr-Lin, et al. "Algal removal from cyanobacteria-rich waters by preoxidation-assisted coagulation-flotation: Effect of algogenic organic matter release on algal removal and trihalomethane formation", Journal of Environmental Sciences vol. 63, pp. 147-155, Feb. 20, 2017.
Zamyadi, et al., "Cyanobacterial management in full-scale water treatment and recycling processes: reactive dosing following intensive monitoring", Environmental Science: Water Research & Technology, vol. 2, pp. 362-375, 2016.
De Julio et al., et al., "A methodology for optimizing the removal of cyanobacteria cells from a Brazilian eutrophic water", Brazilian journal of Chemical Engineering, vol. 27, No. 1, pp. 113-126, 2010.
Yu, et al., "Prediction of powdered activated carbon (PAC) doses for 2-MIB removal in drinking water treatment using a simplified HSDM approach", Chemosphere, vol. 156, pp. 374-382, 2016.
Newcombe, et al., "Management Strategies for *Cyanobacteria* (blue-green algae): a Guide for Water Utilities", Water Quality Reseach Australia, Research report 74, 2010.
Capelo-Neto et al., "Simulation of saxitoxins adsorption in full-scale GAC filter using HSDM", Water Research, vol. 88, 558-565, 2016.
Bowmer, et al., "Physiology of Geosmin Production by Anabaena circinalis Isolated from the Murrumbidgee River, Australia", Water Sci Technol, vol. 25, No. 2, pp. 259-267, 1992.
"Toxic Cyanobacteria in Water: A guide to their public health consequences, monitoring and management", WHO, E & FN Spon, Section 6.3, 1999, ISBN 0-419-23930-8.

* cited by examiner

METHOD FOR CYANOBACTERIA AND/OR CYANOBACTERIA METABOLITES REMOVAL IN AN AQUEOUS SOLUTION

CROSS-REFERENCE TO RELATED APPLICATIONS

This application is a National Stage of International patent application PCT/IB2018/001621, filed on Dec. 19, 2018, the disclosures of which are incorporated by reference in their entirety.

FIELD OF THE INVENTION

The present invention takes place in the field of water treatment, and more precisely in the field of cyanobacteria and/or cyanobacteria metabolites removal in an aqueous solution. The present invention relates to an adaptive adjustment for cyanobacteria and/or cyanobacteria metabolites removal in an aqueous solution.

BACKGROUND PRIOR ART

Surface raw waters are subject to natural climate change and human activities which can generate significant impact on aquatic ecosystems and can result in the rapid development of aquatic biological species such as cyanobacterial blooms. Cyanobacteria can alter the water quality by their presence and production of metabolites i.e. toxins and taste and odors compounds. Cyanobacterial toxins (or cyanotoxins) such as microcystins, cylindrospermopsin and saxitoxins, are harmful to the environment, animals and human health.

In many countries, regulations are set out.

For instance, in "Toxic Cyanobacteria in Water: A guide to their public health consequences, monitoring and management", the World Health Organization proposed a guideline for a moderate health alert in recreational waters: a density of 100 000 cells/mL, and a microcystin concentration of 1 microgram per liter were proposed.

As another example, in June 2015, the United States Environmental Protection Agency recommends health advisories levels at or below 1.6 micrograms per liter for microcystins and 3.0 micrograms per liter for cylindrospermopsin in drinking water for school-age children through adults. Although being non-regulatory, these health advisories are technical guidance providing information on the health effects.

Water treatments are applied with the goal of rectifying all or part of the defects found in water and caused by inert or living particulate fractions. Among this living fraction can be found cyanobacteria.

Classic methods comprise the use of filters at certain points. However, filters are not able to handle complete water purification due to clogging issues. Specific water treatment may be carried out to prevent filters from clogging.

Elements of cyanobacteria and their associated metabolites, such as toxins and taste and odor (T&O compounds), management for drinking water plants include the establishment of a monitoring of cyanobacteria and of their associated metabolites, and treatment methods for removing toxins.

Water treatment plants use notably clarification and precisely coagulation to remove cyanobacteria and use other treatment to remove intra-cellular metabolites. It is important to remove cyanobacteria before they liberate metabolites. But since it is often difficult to prevent the liberation of metabolites, they also often have to be removed.

Furthermore, the ability to promptly and accurately monitoring cyanobacteria, as well as associated metabolites, in order to correctly identify the exceedance of an alert threshold, is thus a key factor in the implementation of a successful risk management strategy for drinking water production and water reuse.

Furthermore, in order to have an efficient removal of cyanobacteria and associated metabolites, it is a key factor to adjust chemical doses in order to reach a targeted final concentration of said cyanobacteria and associated metabolites.

Cyanobacteria Monitoring

A straightforward solution for monitoring cyanobacteria is to analyze a sample of an aqueous solution in order to assess the cyanobacterial concentration. The enumeration of cyanobacteria by the microscopic method allows determining a reliable estimation of the cyanobacteria concentration. However, such system cannot provide on line results due to sample collection and requires highly qualified personnel. Indeed, cyanobacterial biomass and community composition is highly inconstant in space and time. Therefore, techniques needing laboratory tests to assess the cyanobacterial concentration are not able to provide reliable on line results.

Another solution for monitoring cyanobacteria and associated metabolites is the quantification of cyanobacteria species and genes responsible for metabolites, and especially toxin production based on real-time polymerase chain reaction (PCR). Again, such method cannot provide in situ results and requires skilled personnel. Additionally, real-time PCR is long and expensive.

In contrast, fluorometric probes are able to provide in situ and real-time estimation of cyanobacterial concentration while also being fast and not expensive. Such probes are able to measure intensity and wavelength distribution of an emission spectrum. Cyanobacteria contain pigments, more precisely phycobiliprotein, such as chlorophyll, phycoerythrin and phycocyanin, which emit at different wavelength. Hence, fluorometric probes can measure the quantity of a pigment in a media, presenting relative fluorescent units (RFUs), and converting it into a concentration in cells per mL.

Though, pigment content is variable between species and depends on environmental conditions. As a consequence, the cyanobacterial concentration obtained by fluorometric probes may not be reliable.

Moreover, metabolite, and especially toxin production is transitory in nature and difficult to predict. The types of toxins produced may vary in space and time, making the monitoring tedious. Analytical methods must be used to detect several types of toxins but cannot provide on line results.

In "Cyanobacterial management in full-scale water treatment and recycling processes: reactive dosing following intensive monitoring", published in Environmental Science: Water Research & Technology 2 (2016), p. 362-375, Arash Zamyadi et al. described the use of in situ phycocyanin fluorescence to monitor the cyanobacterial concentration. In order to obtain a reliable cyanobacterial concentration, cyanobacterial species identification and enumeration on samples was conducted using a compound microscope in a Sedgewick-Rafter counting chamber. Consequently, by using such a technique, this method cannot provide fast, economic results on the cyanobacterial concentration and species identification.

Cyanotoxins/Metabolites Monitoring

The treatment of an aqueous effluent consists, for the organic part, not only in the removal of cyanobacteria but also in the removal of metabolites compounds. Such compounds may be contained outside cyanobacteria and considered as dissolved metabolites but they may also be inside cyanobacteria and therefore must be considered as a risk, induced by cyanobacteria, of being excreted. It is important to be able to monitor these metabolites in an aqueous solution.

Cyanobacteria Removal Using Coagulant

In order to remove cyanobacteria from water, different treatments can be carried out.

Among the different treatments, the most usual is coagulation, which is a chemical process involving neutralization of a charge. Coagulation can be used as a preliminary step in filtration. It is particularly important to prevent filters used in the filtration from clogging by the accumulation of biological and chemical particles, for instance cyanobacteria. For example, a maximum cyanobacteria concentration may be determined to avoid clogging. Most known coagulants are iron and aluminum salts but other metals have been found to be effective as well. Coagulation is a key step in water treatment process, especially for cyanobacteria removal.

However, the coagulation process is expensive for water treatment, representing one of the most important costs, mainly due to the cost of coagulant. Furthermore, adding too much coagulant into a water to be treated would leave the overflow coagulant remaining in the water. The risk of over-dosing of coagulant is generally not addressed. For instance, the operator adjusts the coagulant dose to have a low value of fluorescence in the settled water but does not know what the lowest dose value that could be achieved is and if the coagulant dose applied is the best compromise.

Indeed, for a long time, the targeted objective of optimizing the coagulation process of water treatment to maximize the removal of cyanobacterial cells has been the source of a large amount of research.

"A methodology for optimizing the removal of cyanobacteria cells from a Brazilian eutrophic water", published in Brazilian journal of Chemical Engineering, Volume 27, p. 113-126, M. De Julio et al. undertook an experimental methodology to construct the dose-pH coagulation diagram on the basis of residual turbidity.

However, to carry their experiments, they collected samples in December, 2007, and stored them for less than a month. Moreover, they used for qualitative identification of cyanobacterial populations a binocular optical microscope and for quantitative identification of cyanobacteria they used the Utermöhl method, which requires 24-48 h of settling.

Thus, such method cannot provide reliable on line measurements and, as a consequence, cannot provide a real time optimization of the chemical dose of coagulant to use, especially when facing cyanobacterial blooms.

Cyanotoxins Removal Using Powdered Activated Carbon

In order to remove cyanobacterial metabolites from water, multiple treatments can be carried out.

The main option is the use of powdered activated carbon (PAC), typical chemical used for seasonal or occasional pollution event control. The carbon adsorption allows removing pollutants from water streams. It is an effective treatment barrier for the removal of extracellular taste and odors compounds as well as cyanotoxins.

The dose of powdered activated carbon is often based on turbidity: turbidity represents the number of individual particles in water and is a key parameter for water quality. However, the concentration measured by turbidity corresponds to the concentration of suspended particles in a sample of water and is not only related to the concentration of cyanobacteria and cyanobacteria metabolites. Hence, the choice of the powdered activated carbon dose does not only depend on the cyanobacteria and their associated metabolites concentration.

Consequently, a powdered activated carbon dose assessment based on a unique measurement of the turbidity cannot be optimized as to remove cyanobacteria and associated metabolites.

Another option for a more precise method is based on site specific lab trials, such as isotherms and kinetics trials using the Homogenous Surface Diffusion Model (HSDM). The method is based on the diffusion of solute molecules on the surface of internal pores within adsorbent particles. It allows predicting certain carbon doses required for drinking water treatment using the Freundlich adsorption isotherm.

However, these trials cannot be carried out on line in treatment plants. These lab trials are extensive and expensive. These lab trials cannot be carried out before the cyanobacteria blooms events and the results are systematically delivered too late. As a consequence, and for security, powdered activated carbon is always dosed in excess during the cyanobacteria blooms events, that may be recognized with tastes and odors events, or when toxins are suspected in order to guaranty the treated water quality.

In "Prediction of powdered activated carbon (PAC) doses for 2-MIB removal in drinking water treatment using a simplified HSDM approach", published in Chemosphere 156 (2016) p. 374-382, Jianwei Yu et al. simplifies an isotherm constant, named the Freundlich 1/n value, assuming it is in a range from 0.2 to 0.6. This assumption allows predicting powdered activated carbon doses using HSDM by conducting only one set of 4-hours kinetic adsorption experiments. 2-MIB stands for 2-Methylisoborneol and is an organic chemical produced by cyanobacteria such as *Anabaena*, responsible for taste and odor issues in drinking water treatment and distribution.

Although the efficiency of the isotherm constant simplification, such an approach remains too long and expensive for the operators of the plant during cyanobacteria blooms events.

There is not an approach allowing the powdered activated carbon adjustment without isotherms and kinetics trials. In other words, there is not a predictive approach, that is not time-consuming and that is not expensive for the operators of treatment plant, especially during cyanobacterial blooms events, and that could use online results.

In summary, there is not a global approach for cyanobacteria control and coagulation that could be applied to all types of aqueous solutions, with different quality parameters such as concentration of cyanobacteria, concentration of metabolites or turbidity, and that could take into account the specificities of different cyanobacteria species and could define what is the best compromise to achieve the maximum cyanobacteria removal without coagulant over-dosing. And there is not as well a global approach for cyanobacteria metabolites control and treatment.

There is therefore the need for a more precise cyanobacteria and/or cyanobacteria metabolites removal treatment in an aqueous solution. There is a need to estimate an adjusted dose of coagulant to remove cyanobacteria, and there is a need for a precise, reliable, adaptative, quick and on-line estimation of such a dose. There is also a need to estimate an adjusted dose of powdered activated carbon to remove associated cyanobacteria metabolites. There is another need to estimate the cyanobacteria concentration as well as the associated metabolites concentration to obtain more precise dose estimations.

SUMMARY OF THE INVENTION

To this effect, the invention discloses a method for cyanobacteria removal in an aqueous solution, comprising a first main step of determining a percentage of coagulable dissolved aromatic organic matter to remove corresponding to a cyanobacteria percentage concentration to remove, a second main step of determining an optimal coagulant dose corresponding to the determined percentage of coagulable dissolved aromatic organic matter to remove and a third main step of applying said optimal coagulant dose as the adjusted coagulant dose for cyanobacteria removal.

The inventors have surprisingly found that, contrary to common perception, the particles elimination by coagulation such as cyanobacteria cannot be easily tied with turbidity. Indeed, in the common perception, turbidity is not an analysis allowing a reliable measurement of the cyanobacteria concentration though it has been commonly used and cyanobacteria elimination in an aqueous solution is rather related to the decrease of dissolved aromatic organic matter in an aqueous solution.

Thus, such a method allows for a better coagulant dose calculation for cyanobacteria removal in order to reach a targeted cyanobacteria concentration before potential further water treatments. It allows reducing the amount of coagulant to use and therefore a considerable economy.

Advantageously, the optimal coagulant dose for eliminating a given percentage of coagulable aromatic organic matter may be determined by at least one test based on UV absorbance results, for instance obtained by Jar tests realized with increasing coagulant doses.

Dissolved aromatic organic matter can be detected by UV absorbance over a coagulation process, being therefore a good indicator of coagulation performance although UV absorbance does not measure directly cyanobacteria concentration.

In an embodiment of the invention, the method comprises, prior to the main steps, the following preliminary steps:
- a first preliminary step of determining the cyanobacteria concentration percentage to remove;
- a second preliminary step of measuring the turbidity of the aqueous solution;
- a third preliminary step of measuring the dissolved aromatic organic matter of the aqueous solution;
- a fourth preliminary step of identifying for the aqueous solution a category among at least two categories of water according to the measured turbidity and dissolved aromatic organic matter of the aqueous solution, each category of water providing a relation between the percentage of cyanobacteria concentration to remove and the percentage of coagulable dissolved aromatic organic matter to remove;
- the first main step using said relation and the determined cyanobacteria concentration percentage to remove.

A category of water can be determined according to a couple of values of turbidity and dissolved aromatic organic matter of the aqueous solution.

For instance, a first category of water could be a high turbidity and high dissolved aromatic organic matter water, corresponding to aqueous solutions whose turbidity is superior to a first value and whose dissolved aromatic organic matter is superior to a second value. A second category could be a low turbidity and a low dissolved aromatic organic matter water, corresponding to aqueous solutions whose turbidity is inferior to the first value and whose dissolved aromatic organic matter is inferior to the second value.

An objective of final cyanobacteria concentration may be set in order to reach a final cyanobacteria concentration required to respect regulations. It may be set to reach a concentration which prevents filters from clogging.

The UV absorbance allows determining the dissolved aromatic organic matter. In particular, the inventors have found out that UV absorbance at 254 nm corresponds to the specific measurement of dissolved aromatic organic matters and is the most suitable UV absorbance to follow the coagulation performance over the cyanobacteria concentration. UV absorbance at 254 nm corresponds to the light intensity weakening through a water sample and is correlated to the measurements of the aromatic cycles and double liaisons such as humic acids. These aromatic organic matters are particularly well eliminated during a coagulation process.

However, only a part of the dissolved aromatic organic matters is eliminated by coagulation even though a very high coagulant dose is used at a favorable low pH. Therefore, it is possible to distinguish a coagulable part from a non coagulable part of aromatic organic matters as a coagulant dose is added into an aqueous solution, which are called "UV coagulable" and "UV non coagulable" parts. The proportion UV coagulable/UV non coagulable is variable according to the water organic matrix and has been defined by lab test using Jar tests with an excessive coagulant dose and a favorable low pH.

Hence, the coagulant dose increases in an exponential manner to eliminate a "UV coagulable" part evolving according to an inverse logarithmic curve, considering a small part which cannot be coagulated. The part which cannot be coagulated may be variable according to the water organic category. Therefore a classification of the aqueous solution into a category is necessary. The categories are separated according to a measurement of the aqueous solution turbidity and a measurement of the aqueous solution dissolved aromatic organic matter, preferably by using UV absorbance at 254 nm. Each category is linked to a particular relation between the cyanobacteria concentration percentage to remove and a percentage of coagulable dissolved aromatic organic matter.

Therefore, in order to remove a percentage of the cyanobacteria concentration in an aqueous solution, a percentage of the coagulable dissolved aromatic organic matter can be determined according to the determined water category which gives a relation between the removal of a cyanobacteria concentration percentage and the removal of the coagulable dissolved aromatic organic matter. Considering that the curve of the cyanobacteria concentration removal follows the coagulable dissolved aromatic organic matter removal, identifying an optimal coagulant dose to remove a percentage of coagulable dissolved aromatic organic matter allows removing a chosen given percentage of the cyanobacteria concentration.

Advantageously, the first preliminary step of determining the cyanobacteria concentration percentage to remove comprises a first initial step of determining the initial cyanobacteria concentration in the aqueous solution and a second initial step of determining an objective of final cyanobacteria concentration in the aqueous solution. The cyanobacteria concentration percentage to remove may be defined by the difference between the determined initial cyanobacteria concentration in the aqueous solution and the determined objective of final cyanobacteria concentration.

Favorably, the method may comprise after the first initial step a third initial step of alerting on the need of eliminating cyanobacteria, if the determined initial cyanobacteria concentration is at least 2 000 cells/ml for metabolites producing cyanobacteria and 10 000 cells/ml for others cyanobacteria.

The method for cyanobacteria removal in an aqueous solution may be particularly focused on a specific type of cyanobacteria. For instance, cylindrospermopsis cells may be targeted for their toxicity and their resistance to coagulant treatment. Thus, a first initial step of determining the initial cylindrospermopsis concentration in the aqueous solution and a second initial step of determining an objective of final cylindrospermopsis concentration would allow determining the cylindrospermopsis concentration percentage to remove. By a similar method of determining one category for the aqueous solution, said category giving a relation between the percentage of cylindrospermopsis concentration to remove and the percentage of coagulable dissolved aromatic organic matter, it is possible to determine the percentage of coagulable dissolved aromatic organic matter. Then, such determined percentage would allow identifying an optimal coagulant dose to use to carry out the cylindrospermopsis concentration percentage removal.

Advantageously, the method may comprise for the first initial step of determining the initial cyanobacteria concentration an evaluation of the cyanobacteria concentration comprising the steps of:

- measuring all or part of the quantity of pigments present in the aqueous solution, chosen among cyanobacteria pigments;
- determining the quantity of pigments for at least a cyanobacteria cell species using a first database;
- determining a cell number of cyanobacteria in the aqueous solution using the measured quantity of pigments and the determined quantity of pigments per cyanobacteria cell species;
- evaluating the cyanobacteria concentration in the aqueous solution according to the determined cell number of cyanobacteria and the aqueous solution volume.

All or part of the quantity of pigments present in an aqueous solution may be measured using a fluorescence probe. The cyanobacteria pigments to measure may be for instance chlorophyll-a and/or phycocyanin. The first database gives the quantity of pigments a cyanobacteria species. The first database preferably comprises estimations of the cell quota for chlorophyll-a and/or phycocyanin for cyanobacteria species.

Alternatively, the method may comprise as a first initial step which consists in evaluating the most likely dominant cyanobacteria species concentration in the aqueous solution, comprising the following steps:

- determining at least a most likely dominant cyanobacteria species for the aqueous solution using a second database;
- determining the quantity of pigments for each of the determined most likely dominant cyanobacteria species using the first database;
- determining a cell number for each of the most likely dominant cyanobacteria species in the aqueous solution using the measured quantity of pigments present in the aqueous solution and the determined quantity of pigments for each most likely dominant cyanobacteria species;
- evaluating the most likely dominant cyanobacteria species concentration in the aqueous solution using the deducted cell number for all most likely dominant cyanobacteria species, and the aqueous solution volume.

The second database allows determining most likely dominant cyanobacteria species for an aqueous solution. The user of such a method may also use data concerning the most likely dominant cyanobacteria gathered before the implementation of the method.

In particular, cylindrospermopsis, a cyanobacteria species known for being resistant to coagulation, may be especially targeted.

In this case, the evaluation of the cyanobacteria concentration comprises the evaluation of the cylindrospermopsis concentration that is:

- measuring all or part of the pigments present in the aqueous solution, chosen among cyanobacteria pigments;
- determining the quantity of pigments for the cylindrospermopsis species using the first database;
- determining the most likely proportion of cylindrospermopsis for the aqueous solution using a second database;
- determining the cylindrospermopsis cell number in the aqueous solution using the measured quantity of pigments present in the aqueous solution, the determined quantity of pigments for the cylindrospermopsis species, and the determined most likely proportion of cylindrospermopsis for the aqueous solution;
- evaluating the cylindrospermopsis concentration in the aqueous solution using the determined cylindrospermopsis cell number and the aqueous solution volume.

The first database comprises the quantity of pigments for cyanobacteria species, so it gives the quantity of pigments for each of the determined most likely dominant cyanobacteria species determined with the second database. Therefore, it is possible to determine a cell number for each of the most likely dominant cyanobacteria species in the aqueous solution.

From the cell number for each of the determined most likely dominant cyanobacteria species in the aqueous solution and from the volume of the aqueous solution, it is possible to evaluate the respective concentrations of each of the determined most likely dominant cyanobacteria species.

Advantageously, the method comprises a metabolite removal step adapted for removing dissolved cyanobacteria metabolites. Such metabolite removal step comprises:

- a first sub-step of determining the dissolved organic carbon matter of the aqueous solution;
- a second sub-step of evaluating the concentration of each cyanobacteria metabolite type in the aqueous solution;
- a third sub-step of determining at least one Freundlich coefficient for each metabolite type in the aqueous solution using the determined dissolved organic matter of the aqueous solution and the closest determined dissolved organic matter of a third database;
- a fourth sub-step of determining a powdered activated carbon dose/contact time couple to be used in the aqueous solution for the removal of the evaluated concentration of each cyanobacteria metabolite type, using the determined Freundlich coefficients;
- a fifth sub-step of applying said powdered activated carbon dose/contact time couple as the adjusted powdered activated dose/contact time.

The third database compiles adsorption coefficients for different cyanobacteria metabolites, different powdered activated carbons and different waters especially different waters with different dissolved organic carbon. Considering the aqueous solution for which the method is carried out, the closest water described in the third database according to the dissolved organic carbon will be chosen to provide corresponding Freundlich coefficients.

Advantageously, the determination of the dissolved organic carbon of the aqueous solution may be carried out by total organic carbon analysis placed after a filtration.

Advantageously, the step of evaluating the concentration of the cyanobacteria metabolite types in the aqueous solution comprises the following steps:
- determining the concentration of the cyanobacteria species in the aqueous solution;
- evaluating the cyanobacteria metabolite types quota for each cyanobacteria species cells using a fourth database;
- evaluating the concentration of the cyanobacteria metabolites types using the determined concentration of the cyanobacteria species in the aqueous solution and the evaluated cyanobacteria metabolites quota for each cyanobacteria species.

The fourth database compiles data giving metabolites quota per cyanobacteria species cells. Such a database may indicate for each cyanobacteria species the different metabolites it may contain and an estimation of respective quantities.

Advantageously, determining the concentration of the cyanobacteria species in the aqueous solution comprises using the evaluated most likely dominant cyanobacteria species concentration in the aqueous solution as described in the evaluation of the most likely dominant cyanobacteria species concentration in the aqueous solution previously exposed.

In one embodiment, determining the concentration of the cyanobacteria metabolite type in the aqueous solution comprises the evaluation of cylindrospermopsin comprising the steps:
- using the evaluation of the cylindrospermopsis concentration in the aqueous solution as described previously;
- evaluating the cylindrospermopsin quota for the cylindrospermopsis using the fourth database;
- evaluating the concentration of cylindrospermopsin using the evaluated cylindrospermopsis concentration and the evaluated cylindrospermopsin quota.

The invention also discloses a computer implemented method for cyanobacteria removal in water as previously exposed.

BRIEF DESCRIPTION OF THE DRAWINGS

The invention will be better understood and its various characteristics and advantages will emerge from the following description of a number of exemplary embodiments and its appended figures in which.

DETAILED DESCRIPTION OF THE INVENTION

Figure 1:
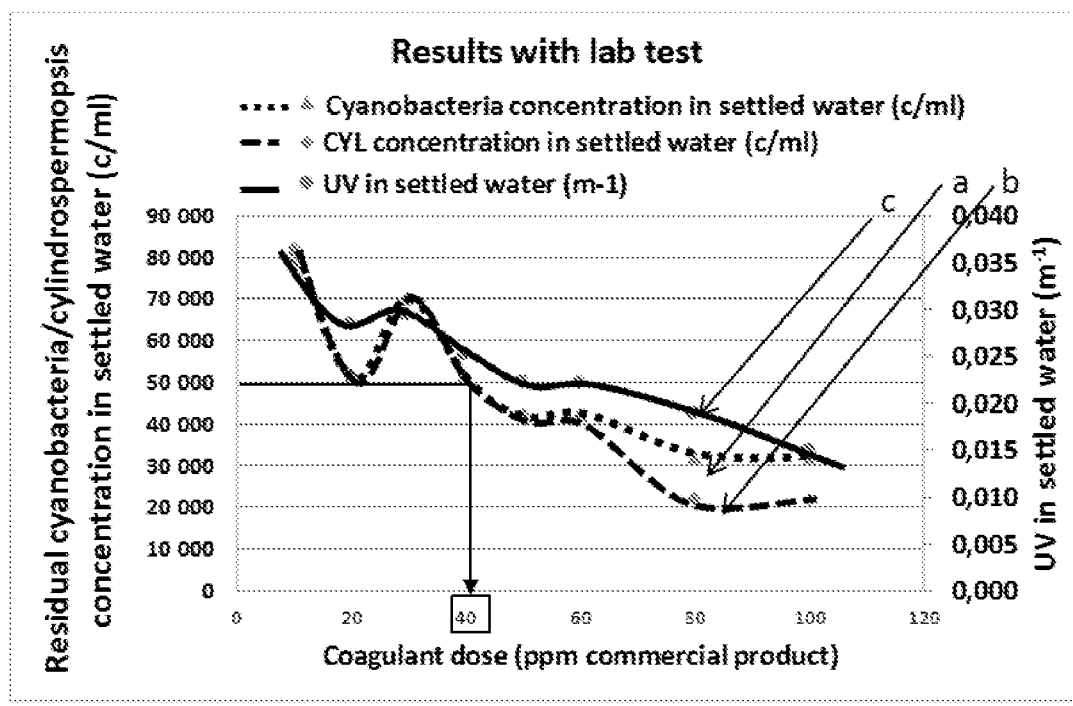
FIG. 1 displays a graph exposing the relation between the coagulant dose, the residual cyanobacteria or cylindrospermopsis concentration and the residual dissolved aromatic organic matter ("UV absorbance") in a settled aqueous solution.

FIG. 1 displays a graph exposing the relation between the coagulant dose to be used, the residual cyanobacteria (graph a) or the residual cylindrospermopsis concentration (graph b) after coagulation and the residual dissolved aromatic organic matter "UV absorbance" (graph c) after coagulation in a settled aqueous solution. The residual "UV absorbance" is equivalent to the residual coagulable dissolved aromatic organic matter.

It is important to note that the residual cyanobacteria and the cylindrospermopsis concentration graphs follow the residual coagulable dissolved aromatic organic matter graph.

Figure 2:
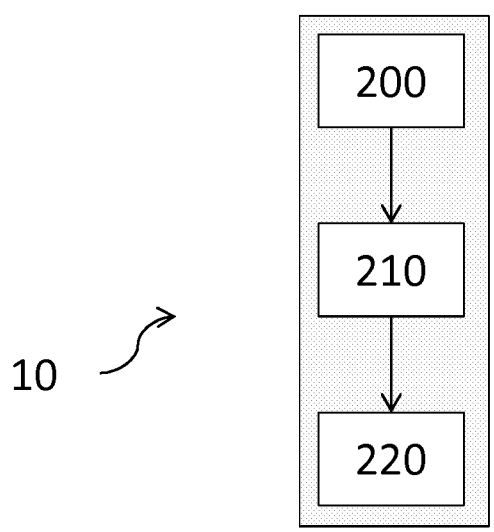
FIG. 2 displays the main steps of a method for cyanobacteria removal in an aqueous solution.

FIG. 2 displays a method 10 for cyanobacteria removal in an aqueous solution, comprising the following main steps:
- a first main step 200 of determining a percentage of coagulable dissolved aromatic organic matter to remove corresponding to a cyanobacteria percentage concentration to remove, using a relation between the percentage of cyanobacteria concentration to remove and the percentage of coagulable dissolved aromatic organic matter to remove;
- a second main step 210 of determining an optimal coagulant dose corresponding to the predetermined to use to carry out the coagulation of the determined percentage of coagulable dissolved aromatic organic matter to remove and;
- a third main step 220 of applying said optimal coagulant dose as the adjusted coagulant dose for cyanobacteria removal.

Figure 3:
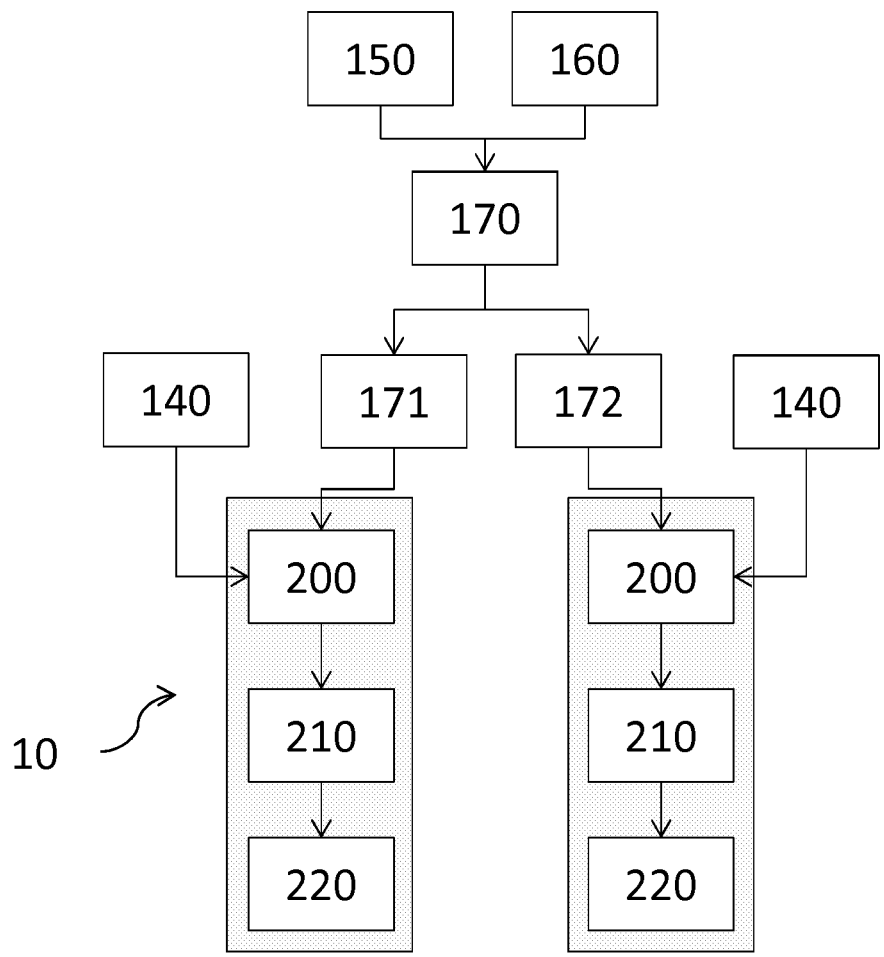
FIG. 3 displays a method for cyanobacteria removal in an aqueous solution with main and preliminary steps.

FIG. 3 displays a method for cyanobacteria removal in an aqueous solution further including preliminary steps.

The preliminary steps are prior to the main steps 200, 210, 220 and comprise:
- a first preliminary step 140 of determining the cyanobacteria concentration percentage to remove;
- a second preliminary step 150 of measuring the turbidity of the aqueous solution;
- a third preliminary step 160 of measuring the dissolved aromatic organic matter of the aqueous solution;
- a fourth preliminary step 170 of identifying for the aqueous solution a category among at least two categories 171, 172 of water according to the measured turbidity and dissolved aromatic organic matter of the aqueous solution, each category of water providing a relation between the percentage of cyanobacteria concentration to remove and the percentage of coagulable dissolved aromatic organic matter to remove;
  - the first main step 200 using said relation and the determined cyanobacteria concentration percentage to remove.

The fourth preliminary step 170 of identifying for the aqueous solution a category among at least two categories 171, 172, requires the second preliminary step 150 of measuring the turbidity of the aqueous solution and the third preliminary step 160 of measuring the dissolved aromatic organic matter of the aqueous solution, preferably by measuring the UV absorbance, preferentially at 254 nm. Each pair of data obtained from turbidity expressed in Nephelometric Turbidity Units (NTU) and UV absorbance expressed in $m^{-1}$ of the aqueous solution corresponds to a predetermined category.

For instance, a first category of water could be a high turbidity and high dissolved aromatic organic matter water, corresponding to aqueous solutions whose turbidity is superior to a first value and whose dissolved aromatic organic matter is superior to a second value. A second category could be a low turbidity and a low dissolved aromatic organic matter water, corresponding to aqueous solutions whose turbidity is inferior to the first value and whose dissolved aromatic organic matter is inferior to the second value.

Each category provides a relation between the percentage of cyanobacteria concentration to remove and the percentage of coagulable dissolved aromatic organic matter ("UV absorbance") to remove.

Using the relation between the percentage of cyanobacteria concentration to remove and a the percentage of coagulable dissolved aromatic organic matter ("UV absorbance") to remove in one category, the fourth preliminary step 170 allows retrieving from the determined cyanobacteria concentration percentage to remove the percentage of coagulable dissolved aromatic organic matter to remove.

Similarly, when focusing the method on the cylindrospermopsis removal, each category gives a relation between the percentage of cylindrospermopsis concentration to remove and the percentage of coagulable dissolved aromatic organic matter to remove.

The relation between the percentage of cylindrospermopsis concentration to remove and the percentage of coagulable dissolved aromatic organic matter to remove allows retrieving from the cylindrospermopsis concentration percentage to remove a percentage of coagulable dissolved aromatic organic matter to remove.

The second main step 210 allows determining an optimal coagulant dose. This optimal coagulant dose will also be the optimal coagulant dose to be used in order to remove a percentage of cylindrospermopsis.

The optimal coagulant dose to be used in order to remove a given percentage of coagulable dissolved aromatic organic matter may be established by prior lab tests with increasing coagulant dose according to the pH of the aqueous solution. Any water treatment plant may adapt its own database of lab tests, or may use other tests giving a relation between the optimal coagulant dose and a given percentage of coagulable dissolved aromatic organic matter to remove.

Figure 4:
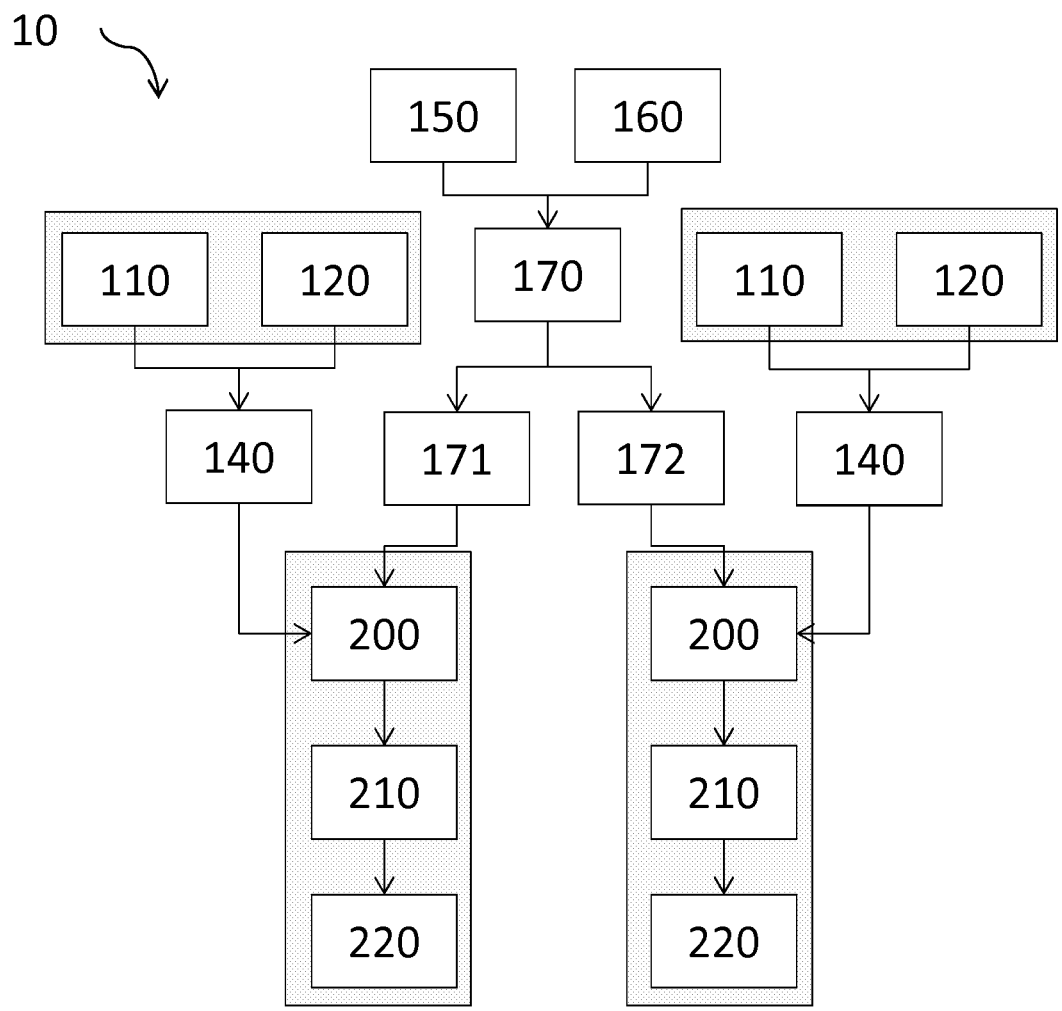
FIG. 4 displays a method for cyanobacteria removal in an aqueous solution with main, preliminary and initial steps.

FIG. 4 displays a method for cyanobacteria removal in an aqueous solution further including main, preliminary.

Furthermore, the first preliminary step 140 comprises the following steps:
- a first initial step 110 of determining the initial cyanobacteria concentration in the aqueous solution and;
- a second initial step 120 of determining an objective of final cyanobacteria concentration in the aqueous solution.

The cyanobacteria concentration percentage to remove may be calculated from initial steps 110 and 120, that is the difference between a determined initial cyanobacteria concentration and a determined objective of final cyanobacteria concentration, depending on the water quality required after the treatment. For instance, the cyanobacteria concentration percentage to remove from an aqueous solution may depend on the capacity of filters which may be used after the treatment of the present invention. For instance, a threshold concentration is targeted in order to prevent filters from clogging due to the cyanobacteria concentration.

Alternatively, the cyanobacteria concentration percentage to remove may be determined directly, without steps 110 and 120.

In a particular embodiment, the method 10 comprises prior to the main steps 200, 210, 220, a first initial step 110 of determining the initial cyanobacteria concentration in the aqueous solution and a third initial step 130 of alerting on the need of eliminating cyanobacteria, if the determined cyanobacteria concentration is at least 2 000 cells/ml for metabolites producing cyanobacteria and at least 10 000 cells/ml for others cyanobacteria.

Figure 5A:
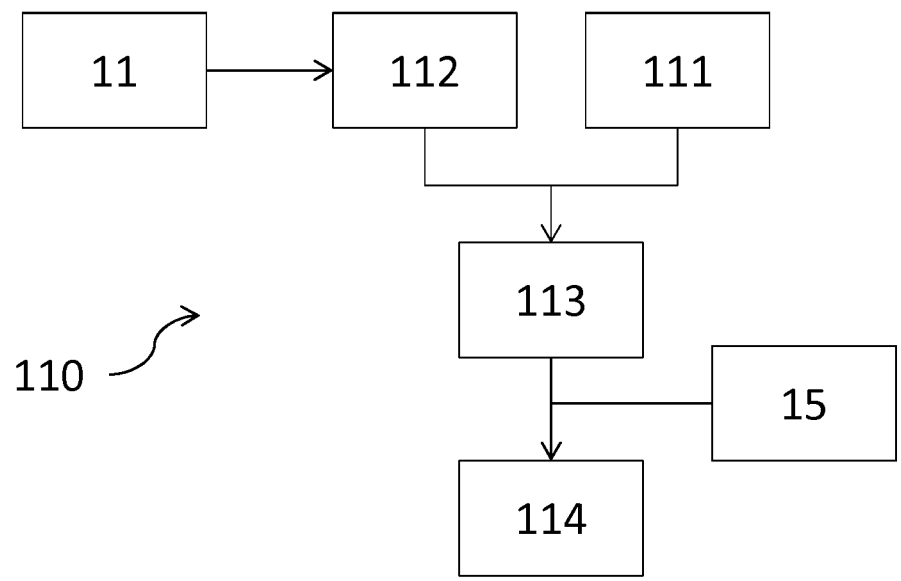
FIG. 5A displays a first embodiment of the step of evaluating the cyanobacteria concentration in an aqueous solution.

FIG. 5A displays a first embodiment 110 of a first initial step of determining the cyanobacteria concentration in an aqueous solution, said first initial step comprising:
- a step 111 of measuring all or part of the quantity of pigments present in an aqueous solution;
- a step 112 of determining the quantity of pigments for at least a cyanobacteria cell species using a first database 11;
- a step 113 of determining a cell number of cyanobacteria in the aqueous solution using the measured quantity of pigments and the determined quantity of pigments per cyanobacteria cell species;
- a step 114 of evaluating the cyanobacteria concentration in the aqueous solution according to the determined cell number of cyanobacteria and the aqueous solution volume 15.

The first database 11 comprises at least the cell quota estimates for chlorophyll or phycocyanin for different cyanobacteria species. For instance, the measurement of the pigments may be carried out by a phycocyanin or chlorophyll-a probe.

Chlorophyll-a or phycocyanin concentration are standard measures of algal or cyanobacterial biomass, and cell chlorophyll-a or phycocyanin quotas are published. For instance, the first database may comprise data according to the chlorophyll-a content of *Anabaena circinalis* and the chlorophyll-a content of *Microcystis aeruginosa*. For instance, the chlorophyll-a content of *Anabaena circinalis* may be 0.72 pg per cell and the chlorophyll-a content of *Microcysits aeruginosa* is 0.36 pg per cell. This may be used to determine the number of cells·mL$^{-1}$ from the chlorophyll-a concentration. Multiple database have been published and disclose chlorophyll-a or phycocyanin concentration. For example, such data have been disclosed by Water Quality Research Australia, published in Research report 74, Management Strategies for Cyanobacteria (blue-green algae): a Guide for Water Utilities.

By dividing the quantity of pigments present in a specific aqueous solution by the quantity of pigments in a cyanobacteria cell species, step 103 allows the determination of a cell number of cyanobacteria in the aqueous solution. Therefore, knowing the cyanobacteria cell number and the volume 15 of an aqueous solution, step 104 allows the evaluation of a cyanobacteria concentration in the aqueous solution.

In a mixture of species, the ability to apply a single division of the quantity of pigments by the quantity of pigments in a single cyanobacteria cell species may not be relevant due to the different species cell quotas. It is preferred to evaluate the most likely dominant cyanobacteria species concentration in an aqueous solution.

Figure 5B:
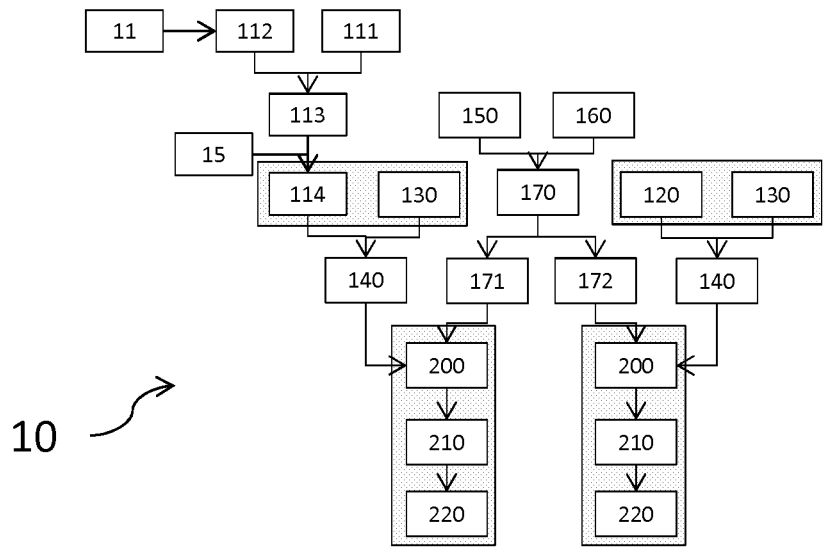
FIG. 5B displays a first embodiment of the method for cyanobacteria removal including the first embodiment of the step of determining the initial cyanobacteria concentration in an aqueous solution.

FIG. 5B displays a first embodiment of the method 10 for cyanobacteria removal including the first embodiment of the first initial step 110 of determining the initial cyanobacteria concentration in an aqueous solution.

Figure 6A:
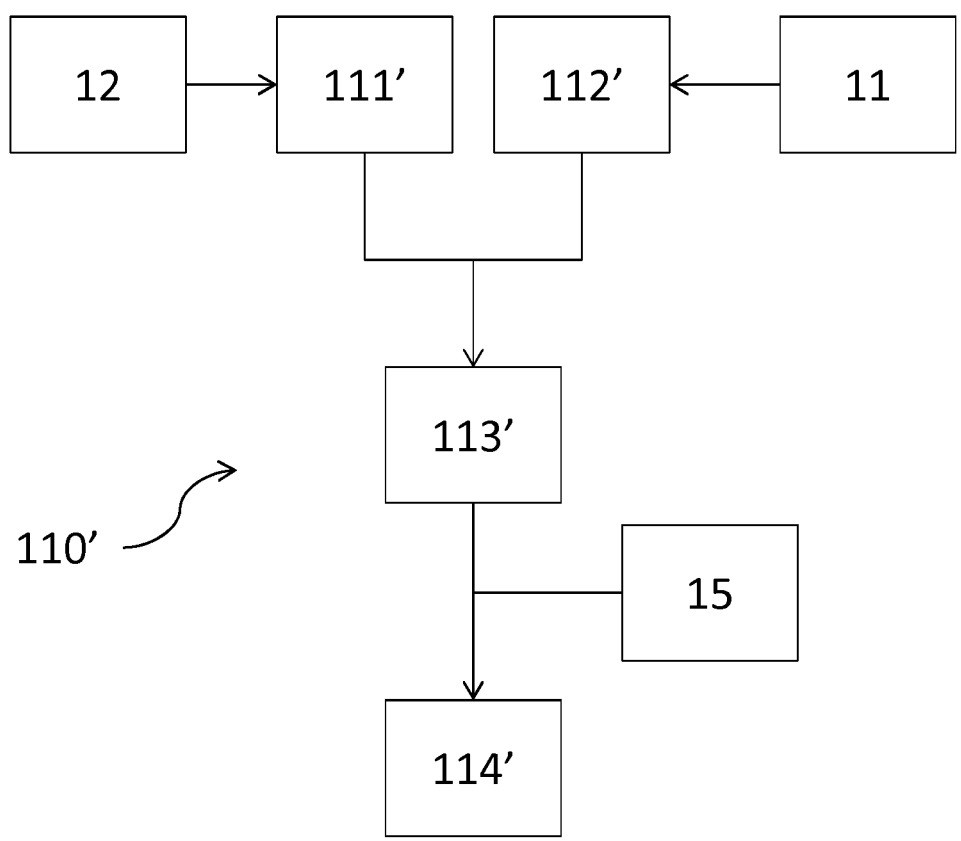
FIG. 6A displays a second embodiment for evaluating the most likely dominant cyanobacteria species concentration in an aqueous solution.

FIG. 6A displays a second embodiment 110' of a first initial step for determining the cyanobacteria concentration in an aqueous solution consisting in evaluating the most likely dominant cyanobacteria species concentration in an aqueous solution. More precisely, said second embodiment 110' of the initial step 110' comprises:
- a step 111' for determining at least a most likely dominant cyanobacteria species for the aqueous solution using a second database 12;
- a step 112' of determining a quantity of pigments for each of the determined most likely dominant cyanobacteria species using the first database 11;
- a step 113' of determining a cell number for each of the most likely dominant cyanobacteria species in the aqueous solution using the measured quantity of pigments present in the aqueous solution and the determined quantity of pigments for each most likely dominant cyanobacteria species;
- a step 114' of evaluating the most likely dominant cyanobacteria species concentrations in the aqueous solution using the deduced cell number for all most likely dominant cyanobacteria species, and the aqueous solution volume 15.

The second database 12 is an extensive database associating the different cyanobacteria species distribution according to different types and/or parameters of waters, therefore allowing determining the cyanobacteria species distribution, depending on the water subject to the method.

The distribution of cyanobacteria species according to a particular type of water can be easily defined using classic analysis of such water type. Multiple data have been published regarding the cyanobacteria species distribution in different types of water. For instance, a percentage of cyanobacteria cells of a particular species in an aqueous solution which exceeds 50% may be considered as a most likely dominant cyanobacteria species for an aqueous solution. For example, lists of cyanobacteria and methods for identifying them have been disclosed by the Afssa (Agence française de sécurité sanitaire des aliments) in a report («Rapport sur l'évaluation des risques liés à la présence de cyanobactéries et de leurs toxines dans les eaux destinées à l'alimentation, à la baignade et autres activités récréatives»).

In this calculation, another complexity is the determination of the species specific cell quotas of phycocyanin fluorescence. Parameters derived from laboratory analyses may provide estimates of quotas for known species in controlled conditions, however these observation may differ significantly to those found in an environmental context due to, light history, nutrient status and physiological state. These same conditions vary from waterbody to waterbody and therefore site specific, species specific parameters will be preferred to reduce the error of predictions as much as possible. Therefore a process to derive site specific, species specific parameters from monitoring program data is defined as follows:

$$x_t = \sum_i^n c_{i,t} \cdot p_i + c + \varepsilon$$

Where $x_t$ is the phycocyanin at time t, $c_{i,t}$ is the cell density of the ith species at time t, $p_i$ is the cell quota parameter of the ith species, c is the background concentration of x and $\varepsilon$ is the residual error of the equation, fitted to observations of cell density and phycocyanin fluorescence using an advanced Monte Carlo Markov Chain approach. This approach defines posterior probability distributions for the parameters allowing the characterization of the uncertainty in the predictions made on the basis of the fluorescence probe outputs. The prediction of cell density is then used to predict the range of concentrations of metabolites that may be present in the water. This is based on lab and field observations of the cell quota of metabolite concentration and the proportion of the metabolite found in the extracellular space. Metabolites are described in terms of the potential range of their concentration by considering best, worst and median metabolite characteristics (cell quota and proportion extracellular) and the range of cyanobacterial predictions.

Figure 6B:
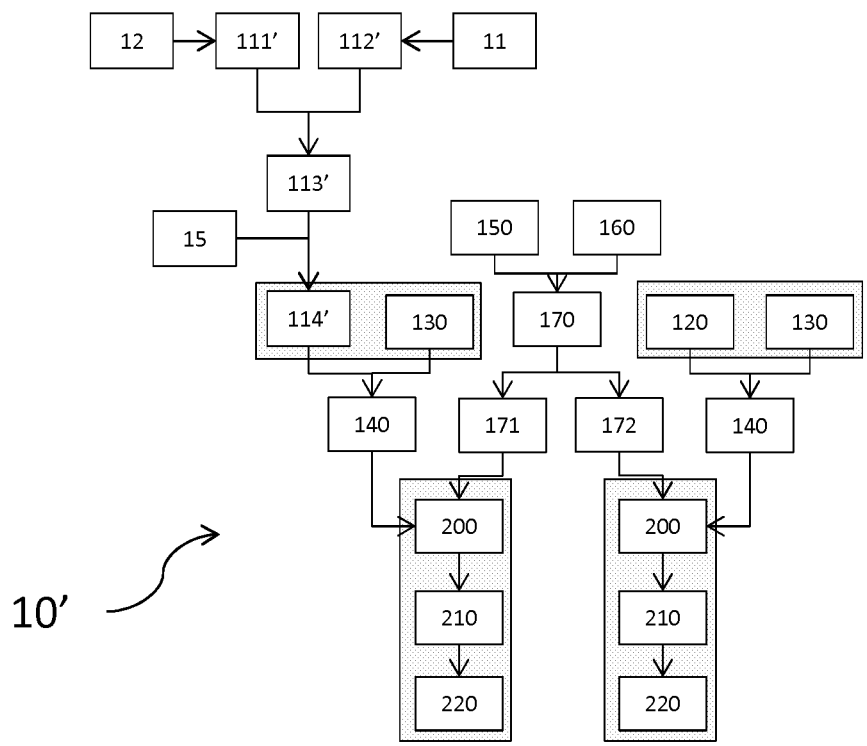
FIG. 6B displays a second embodiment of the method for cyanobacteria removal including the second embodiment of the step of evaluating the cyanobacteria concentration in an aqueous solution.

FIG. 6B displays a second embodiment of the method 10' for cyanobacteria removal including the second embodiment of the step 110' of evaluating the cyanobacteria concentration in an aqueous solution.

Figure 7:
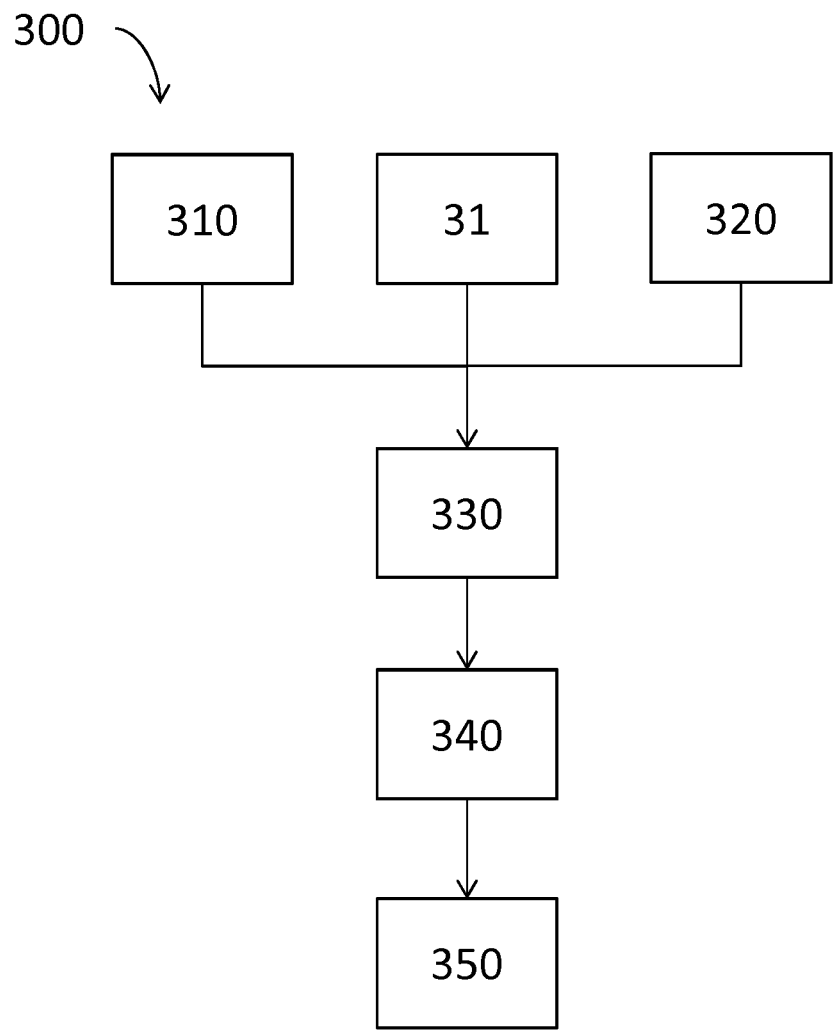
FIG. 7 displays a first embodiment for applying a powdered activated carbon dose to an aqueous solution in order to remove cyanobacteria metabolites by taking into account each metabolite type.
Figure 8:
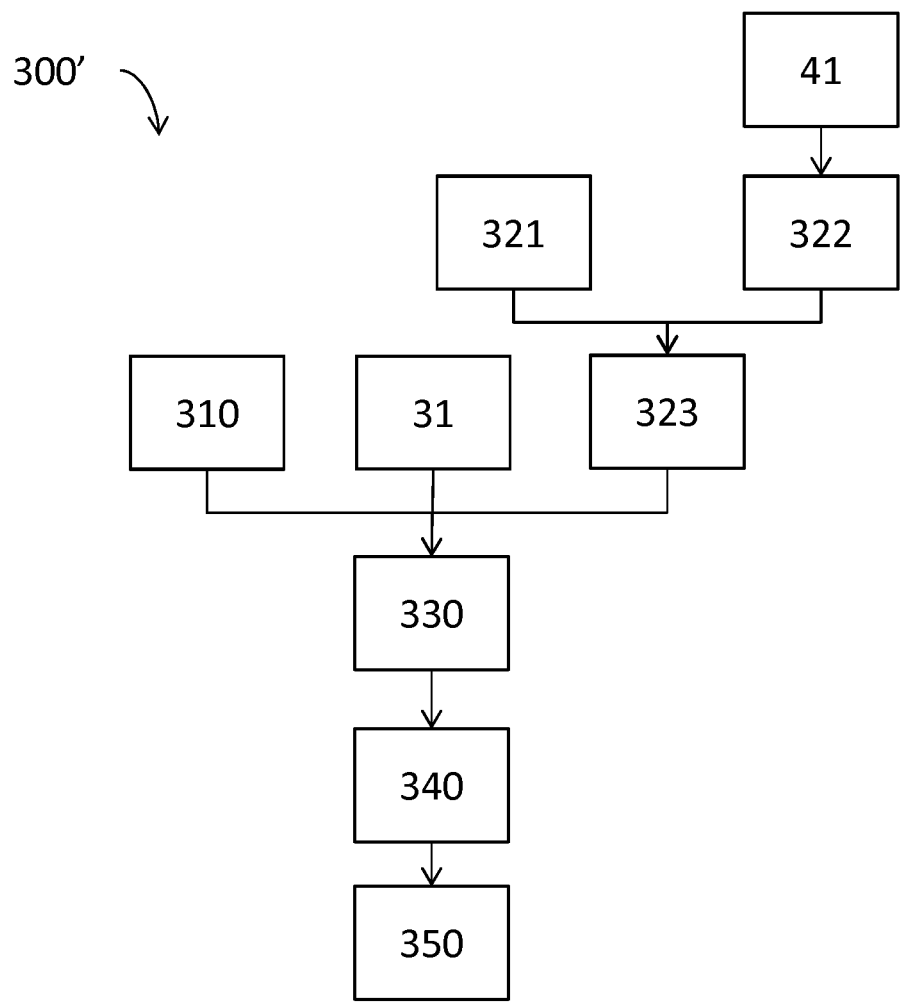
FIG. 8 displays a second particular embodiment for applying a powdered activated carbon dose to an aqueous solution including evaluating the concentration of the cyanobacteria metabolites types.
Figure 9:
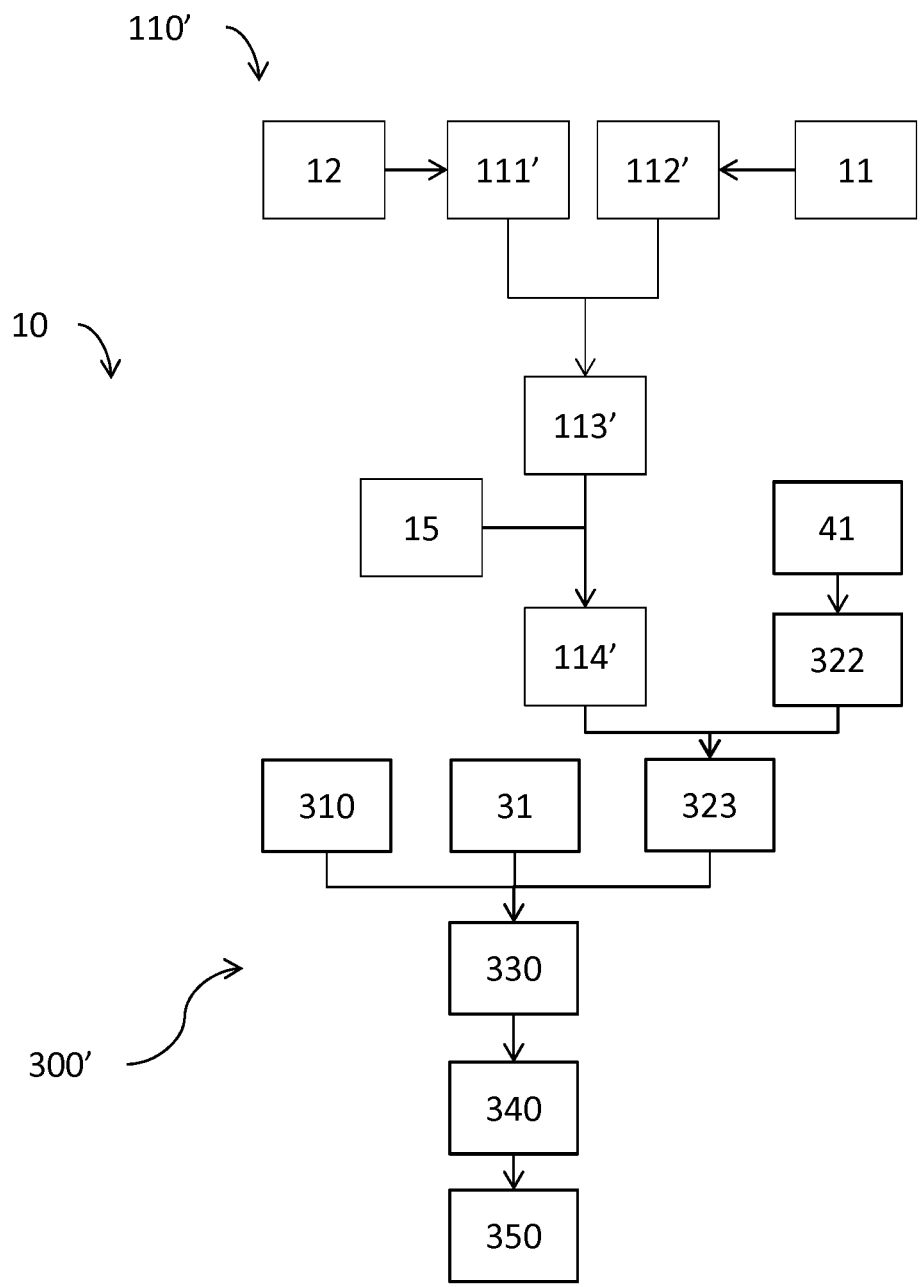
FIG. 9 displays both the second particular embodiment for applying a powdered activated carbon dose to an aqueous solution and the second embodiment of the step of evaluating cyanobacteria concentration in an aqueous solution method for cyanobacteria removal.
Figure 10:
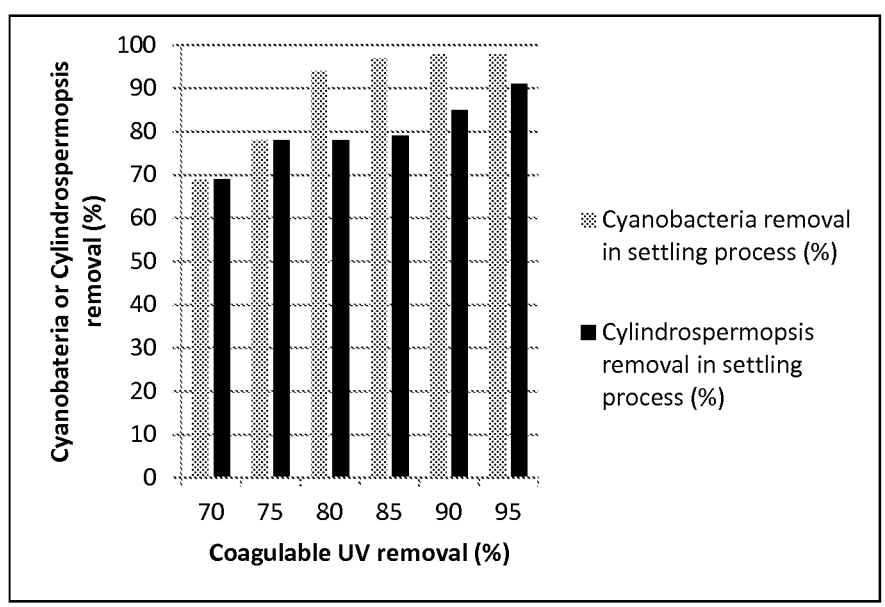
FIG. 10 displays a graph describing the difference between cyanobacteria removal and cylindrospermopsis removal in settling process according to the coagulable UV removal percentage.
Figure 11:
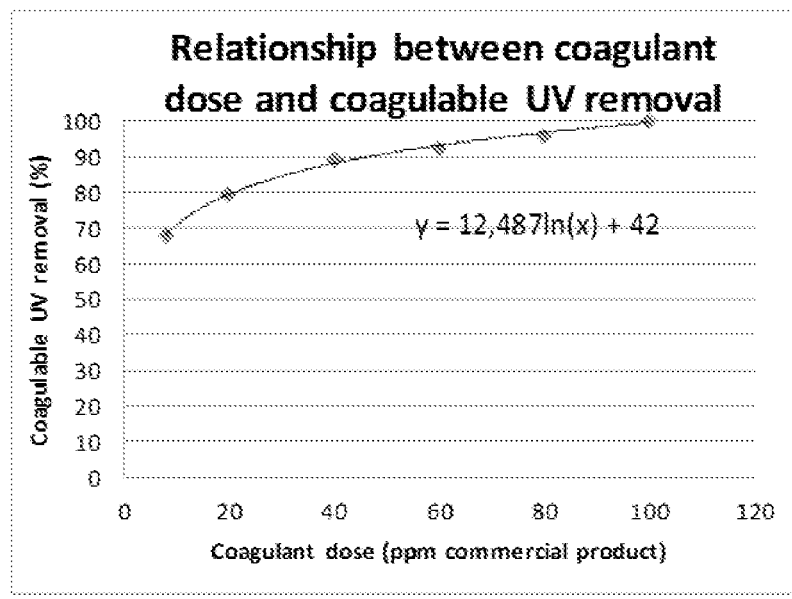
FIG. 11 displays a graph describing the relationship between coagulant dose and coagulable UV removal.
Figure 12:
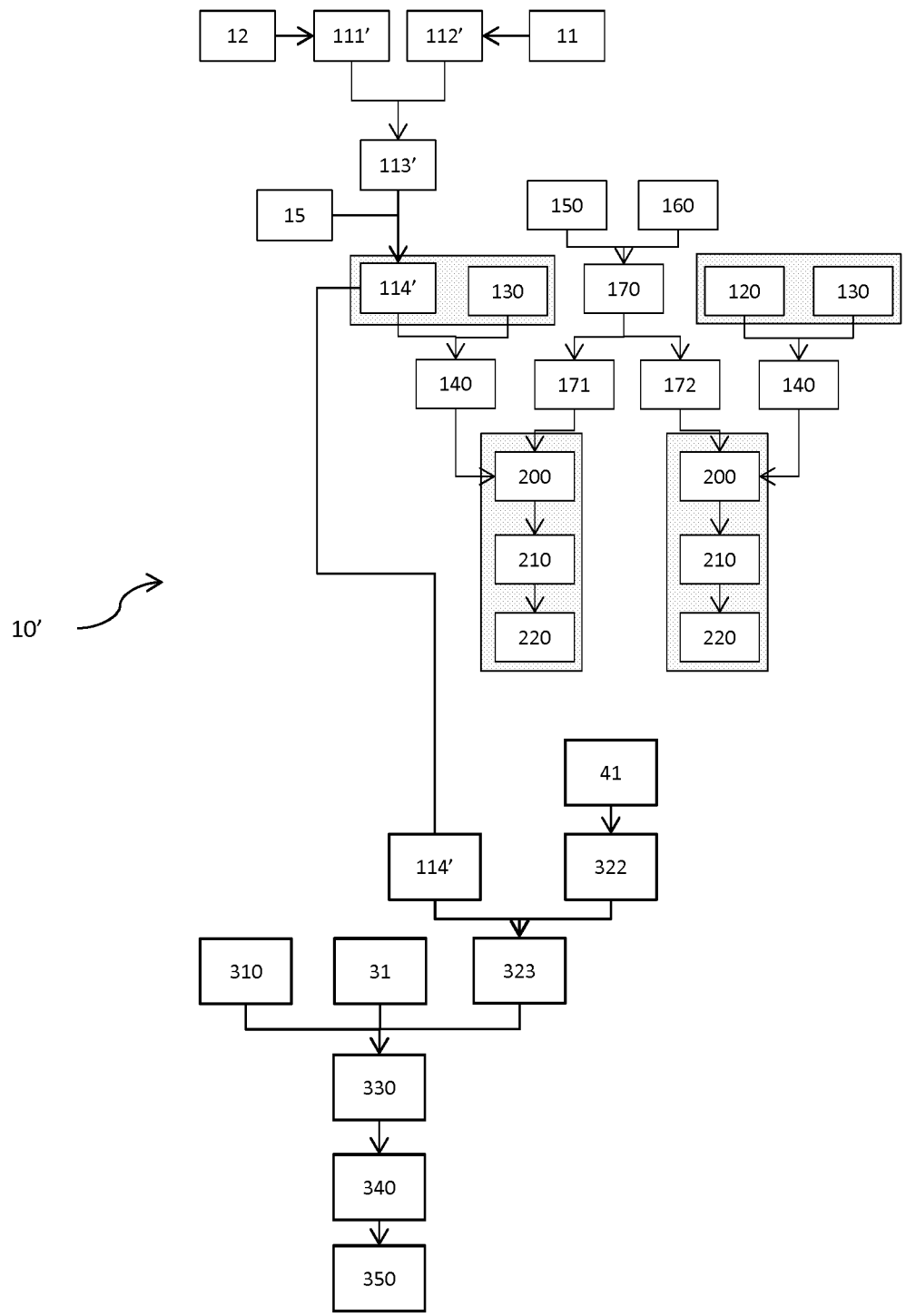
FIG. 12 displays the second embodiment of a global method for cyanobacteria and/or cyanobacteria metabolites removal in an aqueous solution.

FIG. 7 displays a first embodiment 300 of a metabolite removal step consisting in applying a powdered activated carbon dose to an aqueous solution in order to remove cyanobacteria metabolites, taking into account each metabolite type.

The embodiment 300 of a metabolite removal step comprises:
- a first sub-step 310 of determining the dissolved organic carbon of the aqueous solution;
- a second sub-step 320 of evaluating the concentration of each cyanobacteria metabolite type in the aqueous solution;
- a third sub-step 330 of determining at least one Freundlich coefficient for each metabolite type in the aqueous solution using the determined dissolved organic matter of the aqueous solution and the closest determined dissolved organic matter of a third database 31;
- a fourth sub-step 340 of determining a powdered activated carbon dose/contact time couple to be used in the aqueous solution for the removal of the evaluated concentration of each cyanobacteria metabolite type, using the determined Freundlich coefficients;

a fifth sub-step 350 of applying said powdered activated carbon dose/contact time couple as the adjusted powdered activated dose/contact time.

The Freundlich coefficients of the third database can be obtained according to the published research and analysis for different powdered activated carbon types, different metabolites and for different aqueous solution. The application of the Freundlich equation to the adsorption of organic chemicals onto carbons is common. For instance, in "Simulation of saxitoxins adsorption in full-scale GAC filter using HSDM", Jose Capelo-Neto et al. is disclosed methods for determining and using such Freundlich coefficients.

Cellular content or "cell quota" ranges for metabolites are classic measures which are applied to estimate the likely yield of the cyanobacteria metabolites under a type/category of water. Such measures are published or can be obtained by classic analysis. For instance, the fourth database may comprise data according to the proportion of extracellular or dissolved geosmin for a population of a particular cyanobacteria species, i. e. a ratio of geosmin to *Anabaena circinalis* of 100 $ng \cdot \mu g^{-1}$, or a ratio of microcystin to *Microcystis* of 0.12 $ng \cdot \mu g^{-1}$. Relationships between metabolites and chlorophyll concentration have been used to define cell quota and have been published. For instance, the relationship between geosmin and chlorophyll concentrations in culture samples has shown a fairly consistent correlation. For example, in "Physiology of geosmin production by *Anabaena circinalis* isolated from the murrumbidgee river, Australia", K. H. Bowmer et al. data are given regarding ratio of metabolites to the producing cyanobacteria.

FIG. 8 displays a second particular embodiment 300' of a metabolite removal step consisting in applying a powdered activated carbon dose to an aqueous solution further including evaluating the concentration of the cyanobacteria metabolites types.

In this second particular embodiment 300', the second sub-step of evaluating the concentration of each cyanobacteria metabolite type in the aqueous solution comprises:

a step (321) of determining the concentration of the cyanobacteria species in the aqueous solution;

a step (322) of evaluating the cyanobacteria metabolite types quota for each cyanobacteria species cells using a fourth database (41);

a step (323) of evaluating the concentration of the cyanobacteria metabolites types using the determined concentration of the cyanobacteria species in the aqueous solution and the evaluated cyanobacteria metabolites quota for each cyanobacteria species.

FIG. 9 displays both the second particular embodiment of metabolite removal and the first embodiment of the step of evaluating cyanobacteria concentration in an aqueous solution method for cyanobacteria removal.

In FIG. 9 the step 321 of determining the concentration of the cyanobacteria species in the aqueous solution uses the second embodiment 110' of the initial step of determining the initial cyanobacteria concentration in the aqueous solution as the method described at FIG. 6A.

FIG. 10 display a graph exposing the relation between the cyanobacteria percentage removal or the cylindrospermopsis percentage removal and the "coagulable UV" removal according to a category considering the raw water turbidity and dissolved aromatic organic matter.

Especially, the difference between cylindrospermopsis percentage removal exposes the specific difficulty to remove such a cyanobacteria species from an aqueous solution using coagulant for certain types of water. Hence, for certain types of water, the "coagulable UV" removal percentage for cylindrospermopsis is equal or inferior to the "coagulable UV" removal percentage for cyanobacteria.

As an example, FIG. 11 displays a graph exposing a relation between the optimal coagulant dose and a given percentage of coagulable dissolved aromatic organic matter to remove. This relation may be easily used to determine an optimal coagulant dose. The graph represents the coagulant dose in ppm required to coagulate a specific percentage of dissolved aromatic organic matter. Such a relation allows obtaining an optimal coagulant dose required for cyanobacteria, for instance cylindrospermopsis, removal by coagulation when a relation is set up between the cyanobacteria, for instance the cylindrospermopsis, concentration to remove and a percentage of the dissolved aromatic organic matter to remove.

Such an obtained optimal coagulant dose may be added to the aqueous solution depending on the already added dose.

FIG. 12 displays the second embodiment 10' of a global method for cyanobacteria and/or cyanobacteria metabolites removal in an aqueous solution further including the third particular embodiment of a metabolite removal. The global method described is constituted of multiple parts which may be performed independently or successively.

This embodiment comprises: evaluating 114' the most likely dominant cyanobacteria species concentrations in the aqueous solution, determining according to a first preliminary step 140 the cyanobacteria concentration percentage to remove, determining according to a first main step 200 a coagulable dissolved aromatic organic matter to remove and according to a second and third main step 210 and 220 determining and applying an optimal coagulant dose for cyanobacteria removal.

In parallel or further, the evaluated most likely dominant cyanobacteria species concentrations in the aqueous solution from step 114 allows evaluating according to step 323 the concentration of the cyanobacteria metabolites types. Then, the evaluated concentration of the cyanobacteria metabolite types allows determining allows, using the determined dissolved organic matter and a third database, to determine according to the third sub-step 330 at least one Freundlich coefficient for each metabolite type in the aqueous solution and further, according to the fourth and the fifth sub-step 340 and 350 to determine a powdered activated carbon dose/contact time couple to apply as the adjusted powdered activated carbon.

The invention claimed is:

1. A method for cyanobacteria removal in an aqueous solution, comprising the following main steps:

a first main step of determining a percentage of coagulable dissolved aromatic organic matter to remove corresponding to a cyanobacteria percentage concentration to remove;

a second main step of determining an optimal coagulant dose corresponding to the determined percentage of coagulable dissolved aromatic organic matter to remove; and a third main step of applying said optimal coagulant dose to the aqueous solution as an adjusted coagulant dose for cyanobacteria removal, wherein the method further comprises, prior to the main steps, the following preliminary steps:

a first preliminary step of determining the cyanobacteria percentage concentration to remove;

a second preliminary step of measuring a turbidity of the aqueous solution;

a third preliminary step of measuring dissolved aromatic organic matter of the aqueous solution; and a fourth preliminary step of identifying a category corresponding to the aqueous solution by using: (1) the measured turbidity value from the second preliminary step and the measured dissolved aromatic organic matter value from the third preliminary step; and (2) a list of predetermined categories, wherein each category in the predetermined categories is linked to a relation between a cyanobacteria percentage concentration to remove and a percentage of coagulable dissolved aromatic organic matter in the aqueous solution, said identifying the category corresponding to the aqueous solution is based on at least:
(1) a comparison between the measured turbidity value from the second preliminary step and a plurality of predetermined turbidity values, and
(2) a comparison between the measured dissolved aromatic organic matter value from the third preliminary step and a plurality of predetermined dissolved aromatic organic matter values, wherein each pair of data obtained from the measured turbidity value from the second preliminary step and the measured dissolved aromatic organic matter value from the third preliminary step corresponds to a predetermined category, wherein the category corresponding to the aqueous solution provides a predetermined relationship between the percentage of cyanobacteria concentration to remove and the percentage of coagulable dissolved aromatic organic matter to be remove, and wherein the first main step uses said predetermined relationship and the determined cyanobacteria percentage concentration to remove from the first preliminary step.

2. The method as claimed in claim 1, the first preliminary step of determining the cyanobacteria percentage concentration to remove comprising:
a first initial step of determining an initial cyanobacteria concentration in the aqueous solution;
a second initial step of determining a target value that is a pre-determined value of final cyanobacteria concentration in the aqueous solution.

3. The method as claimed in claim 1, comprising, prior to the main steps, the following steps:
a first initial step of determining an initial cyanobacteria concentration in the aqueous solution; and
a third initial step of alerting on the need of eliminating cyanobacteria, if the determined initial cyanobacteria concentration is at least 2 000 cells/ml for metabolites producing cyanobacteria and at least 10 000 cells/ml for other cyanobacteria.

4. The method as claimed in claim 2, the first initial step of determining the initial cyanobacteria concentration in the aqueous solution comprising the steps:
a step of measuring all or part of the cyanobacteria pigments present in the aqueous solution;
a step of determining a quantity of pigments for at least one cyanobacteria cell species using a first database;
a step of determining a cell number of cyanobacteria in the aqueous solution using the measured quantity of cyanobacteria pigments and the determined quantity of pigments per cyanobacteria cell species;
a step of evaluating the cyanobacteria percentage concentration in the aqueous solution according to the determined cell number of cyanobacteria and an aqueous solution volume.

5. The method as claimed in claim 3, the first initial step of determining the initial cyanobacteria concentration in the aqueous solution consisting of evaluating most likely dominant cyanobacteria species concentrations in the aqueous solution and comprising the following steps:
a step of determining at least a most likely dominant cyanobacteria species for the aqueous solution using a second database;
a step of determining a quantity of pigments for each of the determined most likely dominant cyanobacteria species using a first database;
a step of determining a cell number for each of the most likely dominant cyanobacteria species in the aqueous solution using measured quantity of pigments present in the aqueous solution and the determined quantity of pigments for each of the most likely dominant cyanobacteria species;
a step of evaluating the most likely dominant cyanobacteria species concentrations in the aqueous solution as the cyanobacteria species owing the most cell numbers in an aqueous solution volume, using a deducted cell number for all most likely dominant cyanobacteria species, and the aqueous solution volume.

6. The method as claimed in claim 1, further comprising a metabolite removal step adapted for removing dissolved cyanobacteria metabolites, said metabolite removal step comprising:
a first sub-step of determining a dissolved organic matter of the aqueous solution;
a second sub-step of evaluating a concentration of each cyanobacteria metabolite in the aqueous solution;
a third sub-step of determining at least one Freundlich coefficient for each metabolite in the aqueous solution using the determined dissolved organic matter of the aqueous solution and a closest determined dissolved organic matter of a third database;
a fourth sub-step of determining a powdered activated carbon dose/contact time couple to be used in the aqueous solution for the removal of the evaluated concentration of each cyanobacteria metabolite, using the determined Freundlich coefficients;
a fifth sub-step of applying said powdered activated carbon dose/contact time couple as an adjusted powdered activated carbon dose/contact time to the aqueous solution.

7. The method as claimed in claim 6, the second sub-step of evaluating the concentration of the cyanobacteria metabolites in the aqueous solution comprising the following steps:
a step of determining a concentration of the cyanobacteria species in the aqueous solution;
a step of evaluating cyanobacteria metabolites quota for each cyanobacteria species cells using a fourth database;
a step of evaluating the concentration of the cyanobacteria metabolites using the determined concentration of the cyanobacteria species in the aqueous solution and the evaluated cyanobacteria metabolites quota for each cyanobacteria species.

8. The method as claimed in claim 7, the step of determining the concentration of the cyanobacteria species in the aqueous solution comprising using an evaluated most likely dominant cyanobacteria species concentration in the aqueous solution.

9. A computer implemented method for cyanobacteria removal in water comprising the steps of:
a first main step of determining a percentage of coagulable dissolved aromatic organic matter to remove corresponding to a cyanobacteria percentage concentration to remove; and a second main step of determining an optimal coagulant dose corresponding to the determined percentage of coagulable dissolved aromatic organic matter to remove;

wherein the method further comprises, prior to the main steps, the following preliminary steps:

a first preliminary step of determining the cyanobacteria concentration percentage to remove;

a second preliminary step of measuring a turbidity of the aqueous solution;

a third preliminary step of measuring dissolved aromatic organic matter of the aqueous solution in mol/l; and a fourth preliminary step of identifying a category corresponding to the aqueous solution by using: (1) the measured turbidity value from the second preliminary step and the measured dissolved aromatic organic matter value from the third preliminary step; and (2) a list of predetermined categories, wherein each category in the predetermined categories is linked to a relation between a cyanobacteria percentage concentration to remove and a percentage of coagulable dissolved aromatic organic matter in the aqueous solution, said identifying the category corresponding to the aqueous solution is based on at least:
(1) a comparison between the measured turbidity value from the second preliminary step and a plurality of predetermined turbidity values, and
(2) a comparison between the measured dissolved aromatic organic matter value from the third preliminary step and a plurality of predetermined dissolved aromatic organic matter values, wherein each pair of data obtained from the measured turbidity value from the second preliminary step and the measured dissolved aromatic organic matter value from the third preliminary step corresponds to a predetermined category, wherein the category corresponding to the aqueous solution provides a predetermined relationship between the percentage of cyanobacteria concentration to remove and the percentage of coagulable dissolved aromatic organic matter to remove, and wherein the first main step uses said predetermined relationship and the determined cyanobacteria percentage concentration to remove from the first preliminary step.

* * * * *